(12) United States Patent
Ge

(10) Patent No.: US 9,514,249 B2
(45) Date of Patent: Dec. 6, 2016

(54) RE-ARRANGEABLE, AND CUSTOMIZABLE ACCESS CONTROLLABLE DATA TREE HIERARCHIES, AND METHODS OF USE THEREOF

(76) Inventor: David Qingdong Ge, Irving, TX (US)

( * ) Notice: Subject to any disclaimer, the term of this patent is extended or adjusted under 35 U.S.C. 154(b) by 452 days.

(21) Appl. No.: 13/402,405

(22) Filed: Feb. 22, 2012

(65) Prior Publication Data

US 2013/0218926 A1 Aug. 22, 2013

(51) Int. Cl.
*G06F 17/30* (2006.01)
*G06F 17/24* (2006.01)

(52) U.S. Cl.
CPC ....... *G06F 17/30961* (2013.01); *G06F 17/246* (2013.01); *G06F 17/30126* (2013.01)

(58) Field of Classification Search
CPC ........... G06F 17/246; G06F 17/30126; G06F 17/30961
USPC ........................................................ 707/793
See application file for complete search history.

(56) References Cited

U.S. PATENT DOCUMENTS

| | | | |
|---|---|---|---|
| 5,852,822 A * | 12/1998 | Srinivasan et al. | |
| 6,002,865 A * | 12/1999 | Thomsen | |
| 7,269,786 B1 * | 9/2007 | Malloy et al. | 715/212 |
| 8,307,119 B2 * | 11/2012 | Rochelle et al. | 709/248 |
| 2004/0122792 A1 * | 6/2004 | Salazar | G06F 21/6218 |
| 2009/0144302 A1 * | 6/2009 | Baldwin | 707/100 |

OTHER PUBLICATIONS

Oracle Fusion Middleware Report Designer's Guide for Oracle Business Intelligence Publisher Release 11g (11.1.1) Part No. E13881-02, Nov. 28, 2011, 21 pages.*
Excel 2007: Using the Find and Replace Features, UWEC, Oct. 19, 2007, 3 pages.*
Walkenbach, Excel 2010 Bible, Jun. 28, 2010, John Wiley & Sons, pp. 584-585.*
Goggle, "Google Docs—Online Documents With Real-time Collaboration", http://www.google.com/apps/intl/en/business/docs.html, Retrieved Feb. 16, 2012.
Wikipedia, "Wikipedia", http://www.wikipedia.org/, Retrieved Feb. 16, 2012.
Craigslist, "Craigslist", http://dallas.craigslist.org/, Retrieved Feb. 16, 2012.

(Continued)

*Primary Examiner* — Albert Phillips, III
(74) *Attorney, Agent, or Firm* — Spencer C. Patterson; Grable Martin Fulton PLLC

(57) ABSTRACT

Improved, re-arrangeable, and/or customizable data tree hierarchies, and methods of use thereof, are provided. In one embodiment, a method for customizing a data tree hierarchy includes providing, to a plurality of communication devices that are each associated with one or more respective users, access to a data tree hierarchy. The data tree hierarchy is adapted to include a plurality of data items, and each of the plurality of data items is positionable at one of a plurality of hierarchal levels. The method also includes receiving input from one or more of the communication devices to change a position of one or more of the plurality of data items in the data tree hierarchy, and changing the position of the one or more of the plurality of data items in the data tree hierarchy in response to receiving the input from the one or more of the communication devices.

27 Claims, 7 Drawing Sheets

(56) References Cited

OTHER PUBLICATIONS

Wikipedia, "Online Analytical Processing", http://en.wikipedia.org/wiki/Online_analytical_processing, Retrieved Feb. 16, 2012.
SAP, "SAP Crystal Solutions", http://www.sap.com/solutions/sap-crystal-solutions/index.epx, Retrieved Feb. 16, 2012.
POSTGRESQL, "Debian Readline/Libedit Breakage", http://postgresql.1045698.n5.nabble.com/Debian-readline-libedit-breakage-tt3360317.html, Retrieved Feb. 16, 2012.
Microsoft Corporation, "About Viewing a Document as an Outline", http://office.rnicrosoft.com/en-us/word-help/about-viewing-a-document-as-an-outline-HP005235923.aspx, Retrieved Feb. 16, 2012.
Microsoft Corporation, "Using Windows Explorer", http://www.microsoft.com/resources/documentation/windows/xp/all/proddocs/en-us/app_win_explorer.mspx?mfr=true, Retrieved Feb. 16, 2012.
Microsoft Corporation, "Microsoft SQL Server Overview", http://www.microsoft.com/sqlserver/en/us/product-info/overview-capabilities.aspx, Retrieved Feb. 16, 2012.
SalesForce.com, "Force.com", http://www.force.com/, Retrieved Feb. 16, 2012.
SugarCRM, "Boost Sales, Retain Customers and Save Money", http://www.sugarcrm.com/crm/, Retrieved Feb. 16, 2012.
Wikipedia, "File System", http://en.wikipedia.org/wiki/File_system, Retrieved Feb. 16, 2012.
Wikipedia, "Outliner", http://en.wikipedia.org/wiki/Outline_editor, Retrieved Feb. 16, 2012.
Wikipedia, "B-tree", http://en.wikipedia.org/wiki/B-tree, Retrieved Feb. 16, 2012.
Wikipedia, "Online Analytical Processing", http://en.wikipedia.org/wiki/Olap, Retrieved Feb. 16, 2012.
Wikipedia, "Internet Forum", http://en.wikipedia.org/wiki/Internet_forum#Thread, Retrieved Feb. 16, 2012.

* cited by examiner

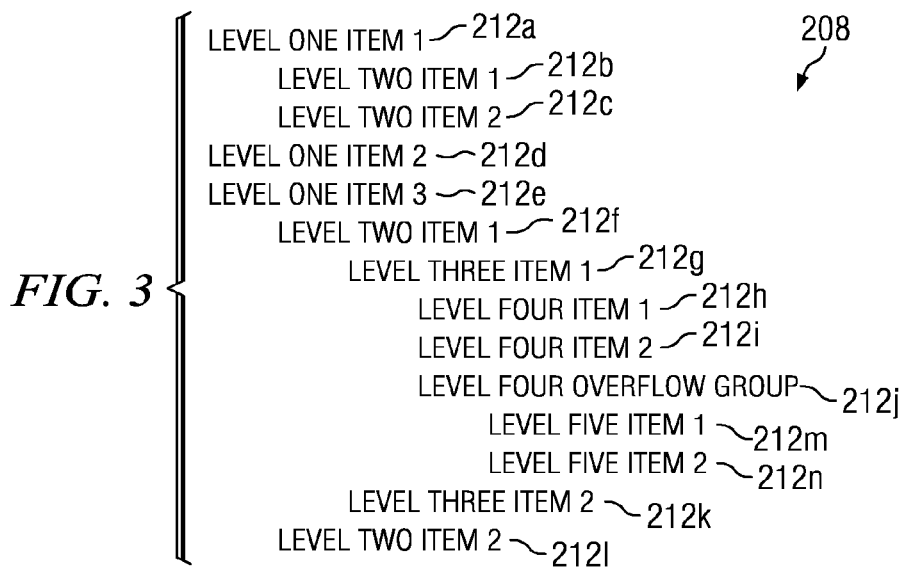
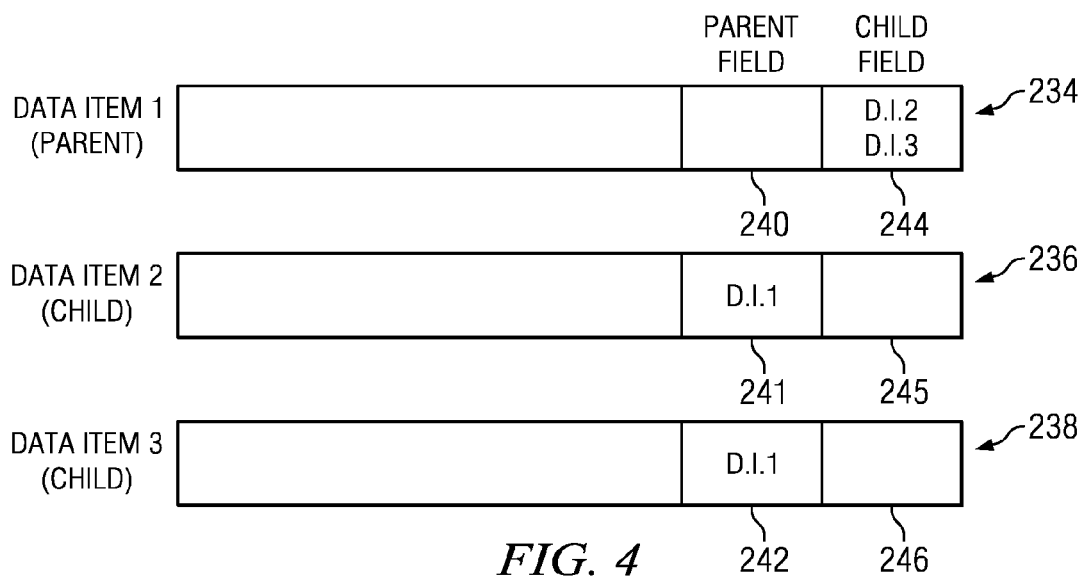

|  |  | COST | PURCH DATE |
|---|---|---|---|
| 512a | ▽ 2010 EXPENSES | | |
| 512b | ▽ JANUARY 2010 EXPENSES | 560 — $800 | 561 — 1/14 |
| 512c | — GAS | $500 | 1/14-1/22/10 |
| 512d | — PAPER AND PENS | 564 — $30 | 565 — 1/14 |
| 512e | — LIABILITY INSURANCE | $225 | 1/9/10 |
| 512f | — CLIENT LUNCH | $45 | 1/22/10 |
| 512g | ▷ FEBRUARY 2010 EXPENSES | $2,450 | 2/2/10-2/26/10 |
| 512h | ▽ MARCH 2010 EXPENSES | $2,130 | 3/1/10-3/21/10 |
| 512i | — PAPER AND PENS | $35 | 3/5/10 |
| 512j | ▽ CLIENT RETREAT WEEKEND | $1,870 | 3/1/10-3/21/10 |
| 512k | — PLANE TICKET | $350 | 3/16/10 |
| 512l | — HOTEL | $400 | 3/16/10 |
| 512m | — SPONSORSHIP | $1000 | 3/1/10 |
| 512n | — MEALS | $120 | 3/19/10-3/21/10 |
| 512o | — LIABILITY INSURANCE | $225 | 3/10/10 |
| 512p | ▷ APRIL 2010 EXPENSES | $1,860 | 4/4/10-4/29/10 |
| | ▽ 2010 CAPITAL EXPENSES | $1,050 | 2/15/10-11/1/10 |
| | PRINTER | $500 | 2/15/10 |
| | SCANNER | $300 | 5/22/10 |
| | CHAIR | $250 | 11/1/10 |
| | ▽ YEARLY EXPENSES | $500 | 6/1/10 |
| | PROFESSIONAL DUES | $500 | 6/1/10 |

*FIG. 7*

RE-ARRANGEABLE, AND CUSTOMIZABLE ACCESS CONTROLLABLE DATA TREE HIERARCHIES, AND METHODS OF USE THEREOF

TECHNICAL FIELD

The illustrative embodiments relate generally to data tree hierarchies, and more particularly, to improved, re-arrangeable, and/or customizable data tree hierarchies, and methods of use thereof.

BACKGROUND

Due, at least in part, to the rise of the Internet and other means of communicating massive amounts of data, users are often confronted with large amounts of poorly organized, outdated, or irrelevant data. As a result, users are often forced to sort through this large amount of data manually in order to find information they are seeking.

One non-limiting example illustrating such a problem is the current use of data tree hierarchies to graphically present data to a user. Data tree hierarchies are often encountered in discussion forums, blogs, websites, and computer applications, but they may also be found in other environments as well. Existing data tree hierarchies suffer from one to several problems that minimize their effectiveness to users. For example, some current systems utilizing data tree hierarchies may fail to allow individual contributions from multiple networked users; these current systems may further fail to allow those users to effectively manipulate the position of their, or others', contributions in the context of the data tree hierarchy. Some current systems may not be effectively usable by multiple users that lack mutual trust to manage or edit information together or collaboratively. Existing data tree hierarchy systems may also lack one or more features that would, if included, increase their usefulness, including, but not limited to, effective search techniques, effective permission level customization, summary features, spreadsheet or other data integration features, as well as others. Other non-limiting examples of problems with current systems utilizing data tree hierarchies are also found, including, but not limited to, the limitations described below and herein.

SUMMARY

According to an illustrative embodiment, a method for customizing a data tree hierarchy includes providing, to a plurality of communication devices that are each associated with one or more respective users, access to a data tree hierarchy. The data tree hierarchy is adapted to include a plurality of data items, and each of the plurality of data items is positionable at one of a plurality of hierarchal levels. The method also includes receiving input from one or more of the plurality of communication devices to change a position of one or more of the plurality of data items in the data tree hierarchy, and changing the position of the one or more of the plurality of data items in the data tree hierarchy in response to receiving the input from the one or more of the plurality of communication devices. In one embodiment, the data tree hierarchy may be composed of items that belong to and are access-restricted to different users.

According to another illustrative embodiment, a data tree hierarchy manager includes a display and interface module to provide, to a plurality of communication devices, access to a data tree hierarchy. The data tree hierarchy is adapted to include a plurality of data items, and each of the plurality of data items is positionable at one of a plurality of hierarchal levels. The data tree hierarchy manager also includes a data tree modification module to receive input from the plurality of communication devices to change a position of one or more of the plurality of data items in the data tree hierarchy, the data tree modification module changing the position of the one or more of the plurality of data items in the data tree hierarchy after receiving the input from the plurality of communication devices.

BRIEF DESCRIPTION OF THE DRAWINGS

FIG. 3 is a generalized schematic representation of a data tree hierarchy according to an illustrative embodiment;

FIG. 4 is a schematic, block diagram of data items that may be included in a data tree hierarchy according to an illustrative embodiment;

FIG. 7 is a schematic, pictorial representation of a data tree hierarchy that includes spreadsheet values according to an illustrative embodiment;

DETAILED DESCRIPTION

In the following detailed description of the illustrative embodiments, reference is made to the accompanying drawings that form a part hereof. These embodiments are described in sufficient detail to enable those skilled, in the art to practice the invention, and it is understood that other embodiments may be utilized and that logical structural, mechanical, electrical, and chemical changes may be made without departing from the spirit or scope of the invention. To avoid detail not necessary to enable those skilled, in the art to practice the embodiments described herein, the description may omit certain information known to those skilled in the art. The following detailed description is, therefore, not to be taken in a limiting sense, and the scope of the illustrative embodiments are defined only by the appended claims.

Figure 1:
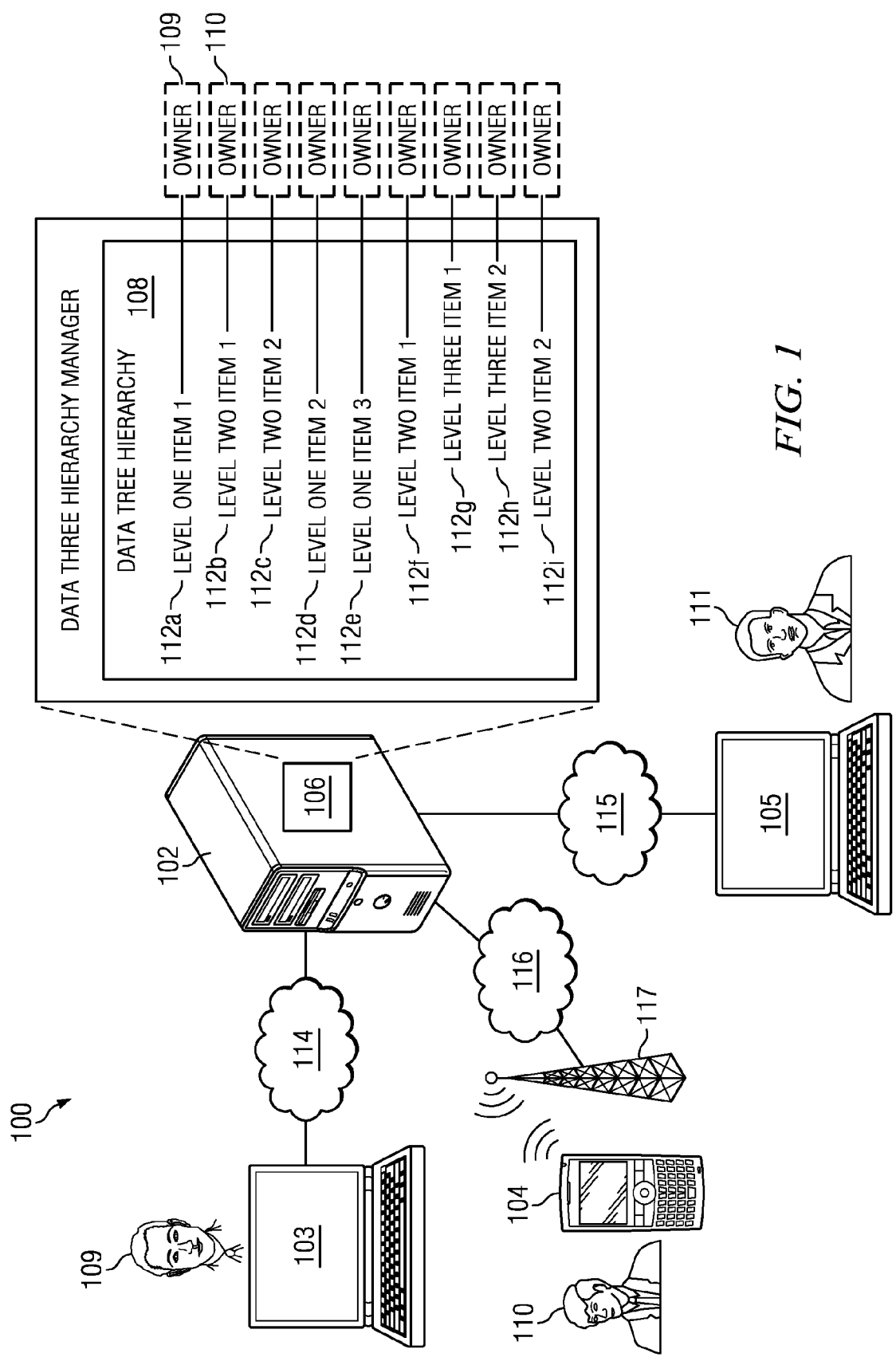
FIG. 1 is a schematic, pictorial representation of an access-controllable data tree hierarchy network system according to am illustrative embodiment.

Referring to FIG. 1, an illustrative embodiment of a data tree hierarchy network system 100 includes one or more servers 102 in data communication with multiple communication devices 103, 104, 105. On the server 102, a data tree hierarchy manager 106 may be executed or implemented. Unless otherwise indicated, as used herein, "or" does not require mutual exclusivity. The data tree hierarchy manager 106 may manage a data tree hierarchy 108 that is accessible to the users 109, 110, 111 of the communication devices 103, 104, 105 using the data tree hierarchy manager 106. In one non-limiting example, the data tree hierarchy manager 106 may be accessed by the users 109, 110, 111 using an Internet browser, or similar application, on the users' respective communication devices 103, 104, 105. In another embodiment, the data tree hierarchy manager 106 may be at least partially implemented or executed on one of the communication devices 103, 104, 105.

The data tree hierarchy 108 may be made up of any number of data items 112a-i. The data items 112a-i in the data tree hierarchy 108 may contain any type of data (e.g., numbers, letters, metadata, links, files, etc.), and may be positioned anywhere in the data tree hierarchy 108. As shown in FIG. 1, the data items 112a-i in the data tree hierarchy 108 may also be in one of several hierarchal levels that are hierarchically nested. For example, data items 112a, 112d, and 112e are positioned at a first hierarchal level. The data items 112a, 112d, 112e may have child data items nested hierarchically below. For example, data items 112b and 112c are in a second hierarchal level that may be considered a child level to the parent level of data item 112a. In the data tree hierarchy 108, the data item 112d does not contain or is not displaying any child data items. The data item 112e at the first hierarchal level contains several child data items including data items 112f and 112i at the second hierarchal level and data items 112g and 112h, which are at a third hierarchal level as a child to both data items 112e and 112f. It will be appreciated that data tree hierarchies, including data tree hierarchy 108, in the illustrative embodiments may contain any number of data items and any number of hierarchal levels; in addition, any of the data items in the data tree hierarchy 108 may be a parent or child of any other data item. Also, each of the data items 112a-i may occupy all or a portion of a row in the data tree hierarchy 108, although other spatial configurations of the data tree hierarchy 108 are possible. In addition, each data item may be owned, or otherwise specifically associated, with a specific user. By way of illustrative and non-limiting example, data item 112a may be owned or contributed by user 109, and data item 112b may be owned or contributed by user 110. In FIG. 1, the remaining data items 112c-i are also shown to be owned, or otherwise specifically associated, with a user in the data tree hierarchy network system 100. Put another way, each of the data items 112a-i in the data tree hierarchy 108 may be contributed by a respective user in the data tree hierarchy network system 100, culminating into the data tree hierarchy 108 having individual contributions from multiple users.

The data tree hierarchy 108 may be used by a large number of users to collaboratively edit/manage a wide variety of contents/data in the illustrative embodiments. For example, the data tree hierarchy 108 may be used to post and/or re-arrange comments, links, or other text information or data in the context of a discussion, forum, blog, social networking, bookmarking, customer service, or other discussion or collaboration, including those that involve many users. As will be described in further detail below, the data tree hierarchy 108 may also be used to organize data in a spreadsheet-like or grid format, while allowing that data to be summarized in some of the data items in the data tree hierarchy 108, including in the context or environment of commercial transaction/financial management sites, such as Craigslist, eBay, Amazon, Mint, etc., or knowledge-based postings, such as Wikipedia, reviews, rankings, opinion collection, task management, etc. The data tree hierarchy 108 may also be used for a large amount of users to contribute or manage a tree hierarchy of program code, data, and settings, as well as pictures and 3D models.

In one embodiment, the data tree hierarchy manager 106 may provide, to the communication devices 103, 104, 105 that are each associated with respective users 109, 110, 111, access to the data tree hierarchy 108. The data tree hierarchy manager 106 may receive input from any one or more of the communication devices 103, 104, 105 and the respective users 109, 110, 111 to add, change, or otherwise manipulate data items 112a-i in any manner. For example, in one embodiment, the users 109, 110, 111 may change the position or content of any of the data items 112a-i in the data tree hierarchy 108. One example of how the users 109, 110, 111 may change the position of one of the data items 112a-i is by dragging and dropping it to a different location in the data tree hierarchy 108. In yet another embodiment, the users 109, 110, 111 may be permitted to add their own respective data items to the data tree hierarchy 108, and be further permitted to change the content or position of their respective added data items in the data tree hierarchy 108, thus allowing the users 109, 110, 111 to change their own data items as well as reposition them around the data tree hierarchy 108. In response to input from the users 109, 110, 111 and their respective communication devices 103, 104, 105, the data tree hierarchy manager 106 may implement the input or instructions received from the users 109, 110, 111, including input that changes the content or position of any of the data items 112a-i in the data tree hierarchy 108.

Data items 112a-i may be repositioned within the data tree hierarchy 108 in a variety of ways, many of which may be selectively or customizably available to any of the users 109, 110, 111 depending on their permission level. For example, any of the data items 112a-i may be repositioned, to a different hierarchal level by one of the users 109, 110, 111. One non-limiting example of changing the hierarchal level of a data item includes moving, e.g., the data item 112g, which is at the third hierarchal level, to the same first hierarchal level as data items 112a, 112d, and 112e, thus changing the data item 112g from a child level of the first and second hierarchal levels to a parent level of the second and third hierarchal levels. Data items may also be moved from a parent level to a child level or subtree, as desired or permitted. Repositioning data items within the data tree hierarchy 108 is not limited to movement between the hierarchal levels, however. For example, a data item may be moved to a different position within the same hierarchal level. For example, in the data tree hierarchy 108, data item 112g is positioned just above data item 112h. Using the data tree hierarchy manager 106, one of the users 109, 110, 111 may move the data item. 112g to be positioned below the data item 112h, thus repositioning the data item 112g within the same third hierarchal level.

It will be appreciated that parent data items within the data tree hierarchy 108 may themselves contain data (e.g., numbers, letters, metadata, links, files, etc.) from one of the users 109, 110, 111 or from any other source; thus, such parent data items are not limited to being only a folder that contains child data items. Also, any data item 112a-i may be placed under, over, subordinate to, or superior to any other data item 112a-i in the data tree hierarchy 108, and the hierarchal level of any of the data items 112a-i may be modified by one of the users 109, 110, 111, taking into account any permission levels in effect. The feature of permission levels is described in more detail below. As will also be described in further detail below, parent, or other, data items within the data tree hierarchy 108 may be or include summary data items that summarize the child items therebelow in some manner, thereby providing useful information to the user in a user-friendly manner.

The repositioning of the data items 112a-i within the data tree hierarchy 108 may be performed in a variety of ways. For example, data items may be dragged, and dropped into different, positions in the data tree hierarchy 108 by the users 109, 110, 111. In yet another example, any of the users 109, 110, 111 may click (e.g., right-click) on any of the data items to open a menu of selections that allow the users 109, 110, 111 to choose a destination level or data item for the selected data item. In yet another example, the data items 112a-i may be moved within the data tree hierarchy 108 by using/pressing keyboard keys, other input devices, or by being automated by program code on the user's behalf. Indeed, the number of ways in which items may be repositioned within the data tree hierarchy 108 are numerous.

Although FIG. 1 illustrates three users 109, 110, 111 associated with three communication devices 103, 104, 105, any number of users or communication devices may be included in the data tree hierarchy network system 100. Thus, the data tree hierarchy network system 100 may allow dozens, hundreds, thousands, millions, etc. users to collaborate, manipulate, or otherwise contribute to the data tree hierarchy 108 by the use of the data tree hierarchy manager 106. In addition, input to the data tree hierarchy 108 may be received from an administrator, or moderator, of the data tree hierarchy manager 106, including the managing of settings (e.g., permission levels, summary data items, summary data item settings, summarizing operations, etc.) or the changing of the position or content of any of the data items 112a-i or adding a data item.

The illustrative embodiments as described above, and as will be described further below, provide a number of elements or improvements above the existing systems that include data tree hierarchies. For example, the illustrative embodiments may, as desired, depart from a traditional document-based paradigm in which am author creates a page and the viewer sees the same page. The illustrative embodiments may, in contrast, allow for collaboration between multiple networked users and allow contributions from the many different users to dynamically expand, collapse, alter, or change the content of the data tree hierarchy 108. For example, in the illustrative embodiments each of the data items may be managed separately (e.g., as a separate owner, write permission) in a database system, as opposed to the entire document being managed as a single unit. The outline mode of a word processor or spreadsheet, even if able to allow a user to collapse/expand details or move a topic around, may be limited to the information inside one document, and may not be usable for large amounts of users to enter and manage their own part of the information inside a large data tree.

The illustrative embodiments may also dispense with the adverse effects of middleware layers that are caused by user-unfriendliness of database query interfaces. The illustrative embodiments also may avoid the need for large numbers of data items to be inconveniently broken up into pages that must be manually sorted through to find desired data. Indeed, many current systems fail to allow multiple networked users to alter the placement or content of certain data items in the data tree hierarchy 108, forcing a user to cope with a static or undesired format of the data tree hierarchy 108.

Using the illustrative embodiments, the users 109, 110, 111, or an administrator of the data tree hierarchy manager 106, may re-arrange, format, or alter the contents of any of the data items 112a-i to place the data tree hierarchy 108 in a format that allows easier access to desirable data. For example, in a discussion forum data tree hierarchy, useful answers may be elevated to more prominent positions within the data tree hierarchies to allow for easier access for subsequent users. In another example, a user may move his or her contributed data item to an appropriate position that he or she believes is suitable for their data item.

The communication devices 103, 104, 105 may each be any device capable of communicating data. For example, the communication devices 103, 104, 105 may include a computer (e.g., a laptop, netbook, tablet computer, desktop computer, or minicomputer), a cellular phone (e.g., a smart phone), a personal digital assistant, a kiosk, a portable gaming device, a web browsing device, a media player, or any other electronic device capable of communicating data.

The techniques, technologies, or media by which the components of the data tree hierarchy network system 100 intercommunicate are numerous. For example, the data tree hierarchy network system 100, or any portion thereof, may be part of a personal area network (PAN), a local area network (LAN), a campus area network (CAN), a metropolitan area network (MAP), or any other network type. Also, communication between any two of the elements in the data tree hierarchy network system 100 may be direct or indirect. Data communication medium 114 between the communication device 103 and the server 102, as well as data communication medium 115 between, the communication device 105 and the server 102, may be any medium through which data can be communicated. For example, the data communication media 114, 115 may be wired or wireless data connections, and may utilize a virtual private network (VPN), multi-protocol label switching (MPLS), the Internet, or any other data communication media.

The data communication medium 116 between the mobile communication device 104 and the base station 117 may be of the same or similar type as any of the non-limiting examples provided for the data communication media 114, 115. Wireless communication between the mobile communication device 104 and the base station 116 may utilize any wireless standard for communicating data, such as CDMA (e.g., cdmaOne or CDMA2000), GSM, 3G, 4G, Edge, an over-the-air network, Bluetooth, etc.

In one example, the data tree hierarchy network system 100 may utilize the Internet, with any combination of the data communication media 114, 115, 116 representing a worldwide collection of networks and gateways that, use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. FIG. 1 is intended as an example, and not as an architectural limitation for the different illustrative embodiments.

Figure 2:
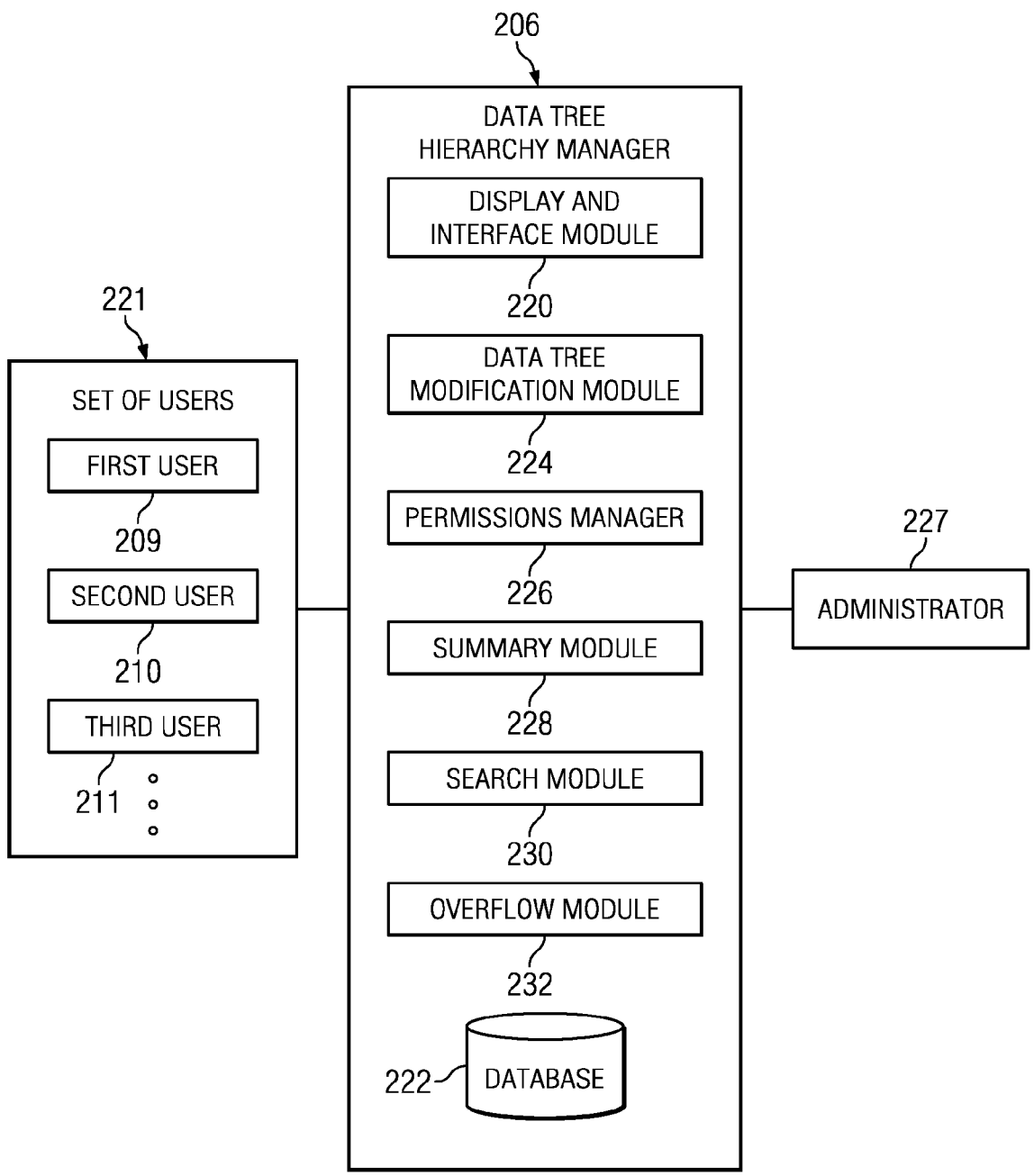
FIG. 2 is a schematic, block diagram of a data tree hierarchy manager according to an illustrative embodiment.

Referring to FIGS. 2, 3, and 4, an illustrative embodiment of the data tree hierarchy manager 206 includes a number of modules or elements that facilitate the functionality of the illustrative embodiments. Elements of FIGS. 2, 3, and 4 that are analogous to elements in FIG. 1 have been shown by indexing the reference numerals by 100. The data tree hierarchy manager 206 includes a display and interface module 220 that may provide access to the data tree hierarchy 208 for the set of users 221. As used herein, including in the claims, the term "set" encompasses a quantity of one or more. An example of the data tree hierarchy 208 that may be displayed to the users 221 is shown in FIG. 3, and includes multiple data items that are each positioned at one of four hierarchal levels.

The set of users 221 includes three users 209, 210, 211 by way of illustration; however, any number of users may be provided access to, or otherwise be in data communication with, the data tree hierarchy manager 206. In addition, as was illustrated in FIG. 1, each of the set of users 221 may be associated with a communication device that facilitates data communication with the data tree hierarchy manager 206.

The data items 212a-l that are displayed to the user 221, or otherwise contained in the data tree hierarchy 208, may be stored in a database 222 that is accessed by the display and interface module 220, and these data items 212a-l may be displayed on the graphical user interface(s) of the communication device(s) associated with the set of users 221. A schematic and generalized example of such a display of the data tree hierarchy 208 is shown in FIG. 3, and additional, more specific, examples are shown in FIGS. 5-8 below.

The data tree hierarchy manager 206 may also include a data tree modification module 224. The data tree modification module 224 may receive input from any of the set of users 221, or their respective communication devices, to modify or provide settings for the data tree hierarchy 208. For example, as previously discussed, the set of users 221 may send input that changes the position of one or more data items in the data tree hierarchy 208. Input may also be received to change, e.g., the content, display format, or, as discussed below, summarizing operations or functionality. In response to receiving this input, the data tree modification module 224 may modify, or manage, the data tree hierarchy 208 in accordance with the input or instructions, taking into account any permissions in place.

To manage permissions, the data tree hierarchy manager 206 may include a permissions manager 226, in one embodiment. The permissions manager 226 may be used to set a permission level for an administrator, or moderator, 227 of the data tree hierarchy manager 206, one of the set of users 221, or may be used to set a permission level for all or a portion of the data tree hierarchy 208 itself. In one embodiment, the permission level, set within the permissions manager 226, may determine an authority or ability to change a position or content of one or more of the data items 212a-l in the data tree hierarchy 208.

In the example in which a permission level is set in the permissions manager 226 for one or more of the set of users 221, the permission level may determine an authority or ability for one or more selected users to modify the data tree hierarchy 208. For example, a permission level may be set for all or a portion of the set of users 221 to be able to change the content or position of the one or more data items added to the data tree hierarchy 208 by the particular user(s) that added the data item, while preventing those users from modifying the content or position of others' data items. By way of specific non-limiting example, the first user 209 may add a data item to the data tree hierarchy 208, and a permission level may be set using the permissions manager 226 such that the first user 209 may change the position or content of the data item added by the first user 209; however, the permission level may also dictate that the first user 209 may not change the position or content of data items added by the second and third users 210, 211. In allowing the first user 209 to change the position or content of his or her own data items, the permission level may also dictate that the first user 209 may move their data item into any position or parent in the data tree hierarchy 208, restricted areas of the data tree hierarchy 208, or other customizable portions of the data tree hierarchy 208. In another embodiment, the permission level may dictate that a user may modify his or her own data items, as well as all or a portion of others' data items.

In addition, the permission level, whether for the user or otherwise, can grant varying types of permissions, such as granting full position moving capability, partial position moving capability (e.g., just permit changing a position within a hierarchal level, just change position within a selected portion of hierarchal levels, etc.), capability to change only the content, but not the positions, of data items, the authority to change summary operations or algorithms, allowing one or more users to change the content or position of data items within particular subtrees in the data tree hierarchy 208, etc.; also, any combination of these permission levels may be used for any of the users 221 or the administrator 227. In addition, the permissions manager 226 may allow all users 221, just selected users, or only the administrator (s) 227 to modify the data tree hierarchy 208 (e.g., change data item positions, change data item contents, etc.). In addition, the administrator 227 may be allowed, by the permissions manager 226, to bypass, deny, adjust, or otherwise customize permission levels for any one or more of the set of users 221.

In one of the illustrative embodiments to change permission levels for the set of users 221 or the administrator 227, more dynamic permission levels may be set than simply setting certain permissions (insert, delete) based on the parent directory. Also, the illustrative embodiments are not limited to granting permissions only at the document level, and the illustrative embodiments are not limited to allowing a user to change any data item based only on whether they are permitted to change the document.

In another embodiment, the permissions manager 226 may be used to set a permission level for one or more of the hierarchal levels in the data tree hierarchy 208. In the non-limiting example of the data tree hierarchy 208 in FIG. 3, there are four hierarchal levels. The permission level for one of the hierarchal levels may determine am ability for one or more of the users 221 to change a position or content of the data items in the hierarchal level for which the permission is set. The permission manager 226 may also be used to set permission levels for particular parent or child data items, or subtrees within the data tree hierarchy 208, such that only certain or specified users are able to change or move data into, out of, or within the particular data item or subtree for which the permission level is set. Using the illustrative embodiments, the permissions manager 226 is not limited only to granting read or write permission based on the setting of each folder or file, and may instead have the ability to place access permission on subtrees, thereby providing convenience of not having to set permissions for each particular folder or file. Using the illustrative embodiments, the permissions manager 226 may also not be limited only to manual processes that change permission settings one time.

In one embodiment, the data tree hierarchy manager 206 may also include a summary module 228 to summarize data contained in at least a portion of the data items 212a-l in the data tree hierarchy 208 to form summary data. The display and interface module 220 may then display the summary data in one or more summary data items that are included, in the data tree hierarchy 208. To provide a non-limiting example, data item 212a in the data tree hierarchy 208 may contain summarizing data, and therefore act as a summary data item, for the child data items 212b and 212c. In "summarizing" the child data items 212b and 212c, the summary data item 212a may include data that provides a summary of the child data items 212b, 212c in some fashion.

For example, summary data item 212a may include a number of child data items thereunder (e.g., 2), the most common value in the child data items 212b, 212c, a highest or lowest value in the child data items 212b, 212c, a most common term or word in the child data items 212b, 212c, an average, mean, or other mathematical calculation using at least a portion of the child data items 212b, 212c, etc. Also, as will be discussed in further detail in FIG. 7, the summary module 228 may also perform a summarizing operation to determine one or more summary values to be included in the summary data item 212a, including the operations discussed just above.

Summary module 228 may provide that any parent data item in the data tree hierarchy 208 (e.g., any data item having child data items thereunder) may contain summarizing data. The data that is summarized, by the summary data item 212a may be words, letters, numbers, files, pictures, characters, etc. In addition, the summary module 228 may update the summarizing data in the summarizing data item 212a as items are added or removed to the child data items 212b, 212c thereunder, thereby keeping the summary data item 212a current as child data items are modified, added, or removed. Also, any parent data item may summarize the data in the child data items thereunder upon the addition of a first child data item, in the case in which, the parent data item had no child, data items thereunder beforehand. Individual numerical fields, columns, or rows may also be added to the child data items to cause the summary data item 212a to provide summarizing information for those added or modified fields. The summary module 228, including the functionality thereof, is discussed in greater detail below.

The data tree hierarchy manager 206 may also include a search module 230, which, in one embodiment, may receive search, criteria from one or more of the users 221, or communication devices associated therewith, and identify data in the data items 212a-l of the data tree hierarchy 208 that match or approximate the search criteria. The display and interface module 220 may then graphically indicate the identified data on a graphical user interface for any of the users 221. The search conducted by the search module 230 may be based on a summary data item (e.g., data item 212a) or summary index row. The search module 230 may start from a top row and then match the search criteria inputted by one of the users 221 against the value in the fields of that row and the rows thereunder. The search module 230 may flag the matching rows. If there is less than a predetermined number of row matches, the search module 230 may descend to search child data items of the matched row. In one example, once a certain or predetermined number of matches are generated, the search results may be returned to the requesting user. Using an embodiment of the search module 230, the search module 230 may utilize or return only a summary data item or row where there are too many matched results in child or descendent data items. The illustrative embodiments are not limited only to returning part of matched leaf or child nodes to an end user when the maximum number of items to return is reached.

Matched search criteria may be illustrated or presented to any of the users 221 in any fashion. For example, the matched search criteria in any of the data items 212a-i in the data tree hierarchy 208 may be graphically highlighted or otherwise indicated. The search results may also be returned in a separate window or screen to the user.

The data tree hierarchy manager 206 may also include an overflow module 232. As mentioned previously, the data tree hierarchy 208 may include both parent and child hierarchal levels (e.g., data item 212a may be considered, a parent data item and data items 212b and 212c may be considered child data items). The data tree modification module 224 may receive input to add multiple data items to the child hierarchal level under the parent data item 212a. In one embodiment, the overflow module 232 may determine whether the child data items added under one of the parent items (e.g., data item 212a) meets or exceeds a predetermined overflow threshold (e.g., 5, 10, 500, 1000, 10,000, etc.). If the overflow module 232 determines that the child data items added, to the parent data item 212a meets or exceeds the predetermined overflow threshold, the overflow module 232 may create an overflow group, or data item, in the data tree hierarchy 208 and move at least a portion of those added child data items to the overflow group.

Referring specifically to FIG. 3, a non-limiting example of an overflow group 212j shown. The data tree hierarchy 208 has a data item 212e at a first hierarchal level, data items 212f and 212l at a second hierarchal level under the data item 212e, data items 212g and 212k at a third hierarchal level under the data item 212f, and data items 212h, 212i and overflow group 212j as child data items under the data item 212g. In this non-limiting example, multiple data items have been added under the data item 212g. After the data items 212h, 212i were added under the data item 212g, the overflow group 212j may have been created by the overflow module 232 when a third data item was attempted to be added under the data item 212g. Thus, in this illustrative and non-limiting example, the predetermined overflow threshold may have been "2", and once a third data item was added as a child to the data item 212g, the predetermined overflow threshold of 2 was exceeded, thereby causing the overflow module 232 to create the overflow group 212j. The overflow group 212j may contain any data items (e.g., data item 212n) that are added after the predetermined overflow threshold has been met or exceeded; although, in other embodiments, any of the data items, including those added, before the predetermined, overflow threshold was exceeded (e.g., data item 212m), may be moved to the overflow group 212j by the overflow module 232. A user may be allowed to expand the overflow group 212j to view the data items contained therein.

The overflow group 212j may have any of the properties that have been described herein for any other item or user-entered item. For example, the overflow group 212j may contain summarizing information that summarizes the data items contained therein, which may prevent the user from having to browse through all the data items in the overflow group 212j to get a picture of its contents, as discussed later. The overflow group 212j may also be positioned anywhere within the data tree hierarchy 208, even after it has been created in a particular hierarchal level; this may allow the overflow group 212j to be repositioned to allow for a better organized data tree hierarchy 208. The users 221 or the administrator 227 may also change the name of the overflow group 212j. The overflow group 212j may also group, or be managed to group, data items by category (e.g., discussion topic).

In one embodiment, the use of overflow groups may help to conserve screen space so that large numbers of data items do not need to be displayed on a single screen. Using the illustrative embodiments, the overflow module 232 is not limited to being only an internal data structure that is used inside a database or other program to manage large lists, and is not limited to techniques to minimizing disk access. The illustrative embodiments are also not limited to be internal only, as the illustrative embodiments may allow overflow groups to be displayed, and further manipulated or modified by a user in a way similar to a user-created item. The overflow groups are also not limited to being positioned based on only their values, as, again, the overflow group may be moved around the data tree hierarchy 208.

When information is searched for on, e.g., a website, there can be hundreds, thousands, or even millions of matched items. Oftentimes, a user interface divides these matched items into pages, and these pages must be scrolled or clicked through in order to view the matched items. In one embodiment, by creating the overflow group 212j, items may be grouped or summarized together and can be re-arranged in a more logical, or user-desired, manner later.

The database 222 of the data tree hierarchy manager 206 may store the data items 212a-l that are displayed by the display and interface module 220, as well as any other data tree hierarchies managed by the data tree hierarchy manager 206. In one embodiment, the data tree hierarchy 208 may be dynamically built from linked data items. With specific reference to FIG. 4, a parent data item 234 is shown that has two child data items 236 and 238. The data items 234, 236, and 238 may each contain any number of fields. For example, the data items 234, 236, 238 may contain content fields that include the content, of the data items 234, 236, 238 that are displayed in the data tree hierarchy 208 as presented to one of the users 221. The data items 234, 236, 238 may also contain linked fields that link the data items to one another in a hierarchal format as described above. For example, the data items 234, 236, 238 may contain either or both of a parent field 240, 241, 242 and a child, or children, field 244, 245, 246, respectively. The parent data fields 240, 241, 242 may indicate one or more parent data items that are associated with the data item. For example, the parent field 241 of the data item 236 indicates that the data item 234 is a parent of the data item 236. Also, the parent field 242 of the data item 238 indicates that the data item 234 is a parent of data item 238.

The child fields 244, 245, 246 may indicate one or more child data items that are associated with the data item. For example, the child field 244 of the data item 234 indicates that the data items 236 and 238 are child, data items of the data item 234. Any number of data items may be linked using the parent and/or child fields. The parent and child data items 240, 241, 242, 244, 245, 246 may be updated as the data items 234, 236, 238 are repositioned within the data tree hierarchy 208.

Data consistency or integrity may be maintained between, the child field in a parent item (s), and the parent field in a child item(s). In one embodiment, changing the uplink (e.g., the parent fields 241, 242 of the data items 236, 238) will automatically change the child field 244 of the parent data item 234. In one embodiment, updating the child field 244 of the parent data item 234 may be restricted to re-ordering existing child items in the parent field 244 such that new subitems, child items, or missing existing items in am update request are ignored. In one embodiment, child data items 236, 238 indicated in the parent field 244 of the parent data item 234 are restricted from being deleted as new versions of the data tree hierarchy 208 are uploaded to the data tree hierarchy manager 206 from any of the users 221. For example, if the first user 209 adds the child data item. 236 to the parent data item 234 at t1, and the second user 210 adds the child data item 238 to the same parent data item 234 at t2, and t1 occurs prior to t2, the data tree hierarchy manager 206 may not delete the child data item 236 added by the first user 209 when uploading the updated data tree hierarchy that contains the second, user's child data item 238. By refraining from deleting the child data item 236 added by the first user 209, the child data item 236 added by the first user 209 may be preserved, in the data tree hierarchy 208 when the second user 210 adds his or her child data item 238 to the same parent data item 234.

The parent fields 241, 242 of each of the added child data items 236, 238 may each indicate the parent, data item 234 to which the child data items 236, 238 are added so that they are both properly assigned to the parent data item 234; such changes to the parent field 241, 242 may, in response, update the child field 244 of the parent data item 234 to which the child items 236, 238 are added. Also, despite imposable restrictions on deleting child data items 236, 238 referred to in the child field 244 of the parent data item 234, the child data items 236, 238 indicated in the child field 244 of the parent data item 234 may be re-ordered as updated data tree hierarchies are uploaded to the data tree hierarchy manager 206. In addition, in one embodiment, the ordering of the child data items 236, 238 in the child, field 244 of the parent data item 234 determines now those child data items 236, 238 are displayed, including the order in which they are displayed. Also, when a child data item 236 or 238 is added to a particular parent data item 234, the parent field 241 or 242 of the added child data item 236 or 238 may indicate the particular parent data item. 234, and the child field. 244 of the parent data item 234 may be updated to reflect the addition of the new child data item 236 or 238.

In the illustrative embodiments, data tree parent items may have downlink fields (e.g., child field 244) that contain an array of links to child data items, and multiple child data items may be referenced in the child field 244 of the parent data item 234. Child data items 236 and 238 may have uplinks (e.g., parent fields 241, 242) to the parent data item 234. In one embodiment, because the adding and deleting of child data items may be processed based on child item data (e.g., parent fields 241, 242 of the child data items 236, 238, respectively), the child data item(s) may need to be sorted to be processed before the parent data item.

Using the illustrative embodiments, the data tree hierarchy manager 206 is not limited to organizing an index indirectly based on the value of data, and is not limited to being hidden from the user. In fact, in one embodiment, changing the position of any of the data items 212a-l in the data tree hierarchy 208 may change the uplinks and downlinks contained in the data items 212a-l to reflect changes made by a user. The illustrative embodiments are also not limited only to storing tree information in a relational database.

Also, using the illustrative embodiments, fields in the data items 212a-l may be responsible for maintaining data integrity, and each field may be added to generic tree tables independently. The fields in the data items 212a-l may also contain information regarding how to group subitems.

Figure 5:
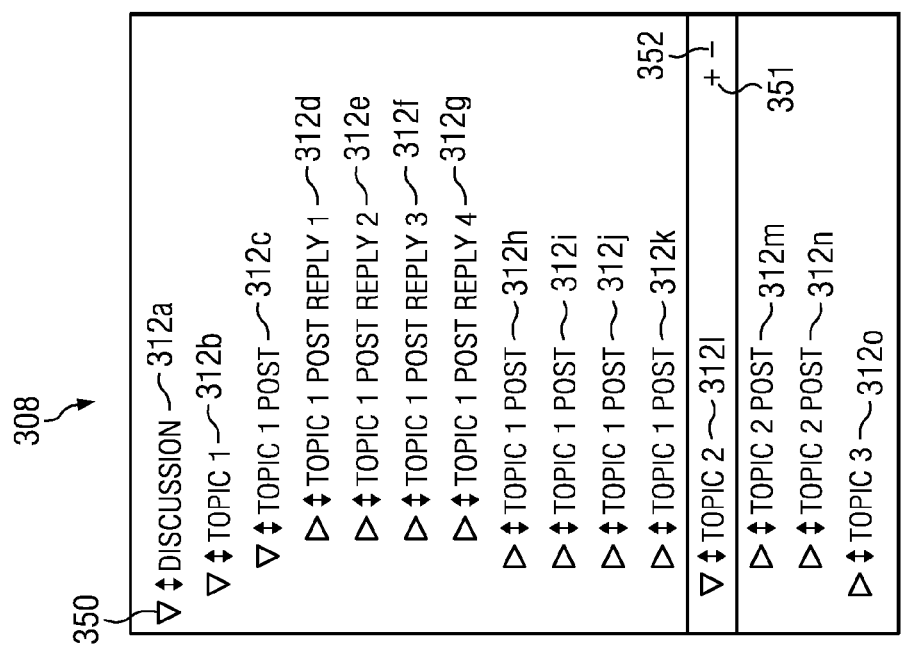
FIG. 5 is a schematic, pictorial representation of a data tree hierarchy according to an illustrative embodiment.

Referring to FIG. 5, an illustrative embodiment of a data tree hierarchy 308 that includes a textual discussion of one or more topics is shown. Elements of FIG. 5 that are analogous to elements in FIG. 1 nave been shown by indexing the reference numerals by 200. The topics in the data tree hierarchy 308 relate to a textual discussion and are each contributed to by one of a plurality of users in communication with the data tree hierarchy manager. Each data item. 312a-o may also substantially relate to the discussion taking place in the data tree hierarchy 308. Examples in which the data tree hierarchy 308 may be found include discussion forums, blogs, or other websites in which discussions take place. While the discussion may be text-based, any type of data object may be included in the data tree hierarchy 308 (e.g., numbers, files, pictures, videos, etc.).

The data tree hierarchy 308 includes four hierarchal levels, with the data item 312a being at the first level, data items 312b, 312l, 312o being at the second level, data items 312c, 312h, 312i, 312j, 312k, 312m, 312n being at the third level, and the data items 312d, 312e, 312f, 312g being at the fourth level. In accordance with the illustrative embodiments, as described herein, any of the data items 312a-o may be moved to different positions within the data tree hierarchy 308 by one or more users. For example, a user that contributes the data item 312d to the data tree hierarchy 308 may then be allowed to move the data item 312d anywhere within the data tree hierarchy 308; the repositioning of the data item 312d may be an improvement in organization so that it is in a better location after movement by the user for access by others, thereby improving the discussion taking place in the data tree hierarchy 308.

Each of the data items 312a-o may include an expansion indicator 350 that indicates whether that data item's children data items are visible or not visible. For example, the expansion indicator 350 next to the data item 312a shows that the data item 312a is expanded so as to show its children data items. The expansion indicator of the data item 312h shows a closed or retracted position, indicating that the children or subitems of the data item 312h are not shown.

Each of the data items 312a-o, or one of the data items 312a-o that is currently selected (e.g., data item 312l), may also include an add data item icon 351 and a delete data item icon 352. The add data item icon 351, when selected, may add a new data item to the data tree hierarchy 308. In one embodiment, if the data item is expanded, as indicated by its expansion indicator, selecting the add data item icon 351 for that data item may add a child data item to the data item for which the add data item icon 351 is selected; conversely, if the data item is closed, again as indicated by its expansion indicator, selection of the add data item icon 351 may add a sibling data item after the data item for which the add data item icon 351 is selected. It will be appreciated that such behavior for adding new data items may be altered depending on the embodiment.

The delete data item icon 352 may delete the data item for which the delete data item icon 352 is selected.

In one embodiment, the deleted data item may move to a "recycle bin" and not be deleted from a backend database immediately so that the deleted data item can be recovered in case of an accidental delete.

Figure 6:
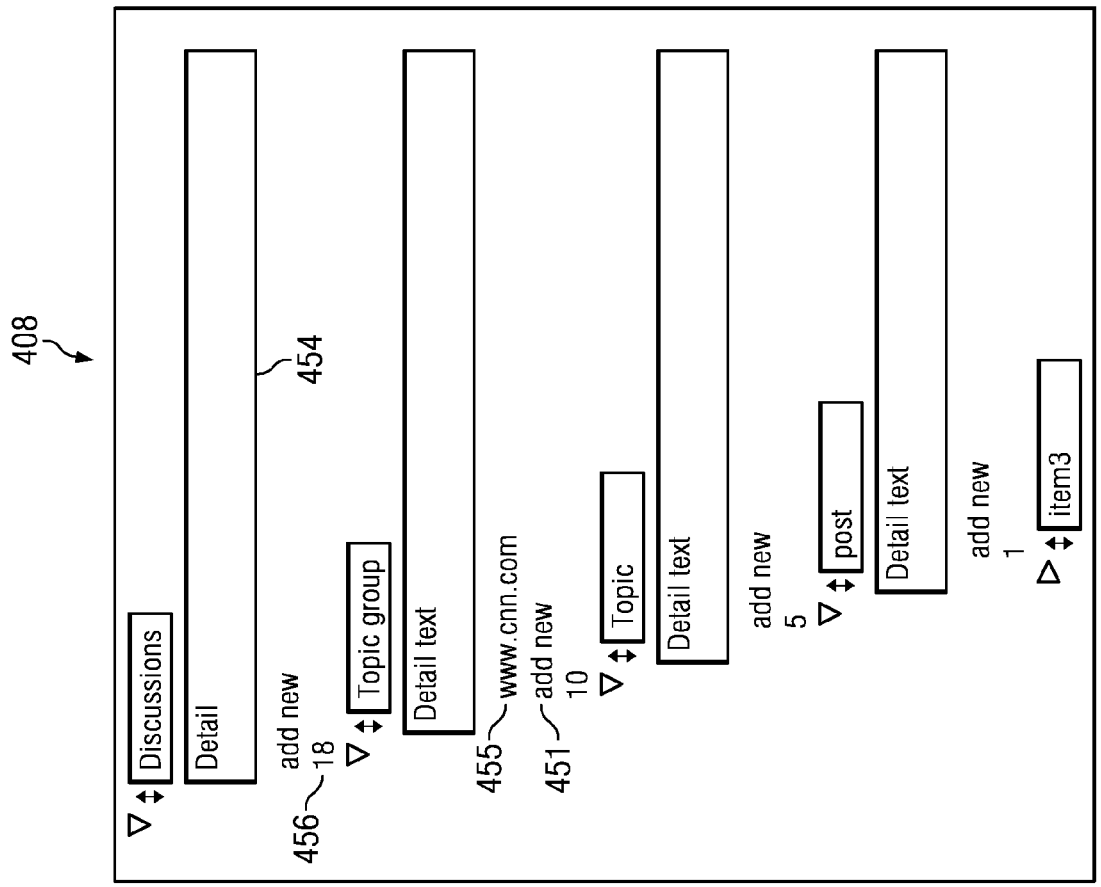
FIG. 6 is a schematic, pictorial representation of a data tree hierarchy that includes discussion boxes according to an illustrative embodiment.

Referring to FIG. 6, an illustrative embodiment of a data tree hierarchy 408 is shown. Elements of FIG. 6 that are analogous to elements in FIG. 1 have been shown by indexing the reference numerals by 300. The data tree hierarchy 408 relates to a text-based discussion of one or more topics. The data tree hierarchy 408 also includes a detailed text field 454 for each of the data items in the data tree hierarchy 408 that allows the user who added the data item, or, alternatively, any other user, to insert detailed text or other content to the data item. The data tree hierarchy 408 also allows the insertion, of a link 455 for any of the data items therein. The data tree hierarchy 408 also includes one or more summary values 456 which, in this case, indicate a number of child data items associated with the parent data item in which the summary value is displayed. The data tree hierarchy 408 also includes an add data item icon 451 for one or more of the data items therein.

Referring to FIG. 7, an illustrative embodiment of a data tree hierarchy 508 includes a grid, or spreadsheet, of data associated with the data items therein. Elements of FIG. 7 that are analogous to elements in FIG. 1 have been shown by indexing the reference numerals by 400. The high level of flexibility for the data tree hierarchies described in the illustrative embodiments allow for data to be included in data items in a spreadsheet-like or grid-like format to allow for enhanced organization and summary of data, as well as dynamic updating and repositioning of data as desired by one or more users. Like the other data tree hierarchies described herein, the data tree hierarchy 508 may be contributed to by multiple users and for any purpose that lends itself to the organization or formatting of data. This type of data tree hierarchy 508 may be used to manage data, including large amounts of data generated by many different users or a single user.

In the non-limiting example of the data tree hierarchy 508, multiple data items 512a-p are displayed. At a first hierarchal level is the data item 512a, which relates to the 2010 expenses for a particular business or entity. The data item 512b, 512g, 512h, 512p are child data items under the data, item 512a that each respectively relate to 2010 expenses for a particular month. The data items 512c, 512d, 512e, 512f are child data items under the January 2010 expenses data item 512b that pertain to particular purchases made during the month of January 2010. Likewise, the data items 512i, 512k, 512l, 512m, 512n, 512o each relate to particular expenses during the month of March 2010, with, a portion of these data items related to the client, retreat weekend data item 512j. Users may organize the tree structure flexibly, instead of just summarizing existing database fields, as in some current database analysis software. For example, a user may put non-monthly recurrent expenses into a separate item to avoid distortion of the monthly summary; an example of this is illustrated by the 2010 Capital Expenses and Yearly Expenses data items in FIG. 7. It will be appreciated that the data items presented in FIG. 7 are for illustrative purposes only, and the data items in the data tree hierarchy 508 may relate to any topic.

The data tree hierarchy 508 includes summary data items 512b, 512g, 512h, 512j and 512p. Each of these summary data items 512b, 512g, 512h, 512j, 512p includes a subset of data items (or child data items), as indicated above, that are nested thereunder. The summary data items 512b, 512g, 512h, 512l, 512p summarize at least a portion of the data contained in the subset of data items or child items thereunder. In particular, the summary data items 512b, 512g, 512h, 512j, 512p summarize the data contained in the cost and purchase date fields in each of the subset of data items thereunder. It is noted that the child data items for the February and April 2010 expense data items 512g, 512p are not shown because the expansion indicators associated therewith show that these summary data items are retracted so as not to display their respective child data items; however, these data items may be opened or expanded as desired by a user or the administrator.

Each of the summary data items 512b, 512g, 512h, 512j, 512p includes two summary fields, one for each of the three columns containing data (i.e., cost and purchase date). For ease of explanation, the summary data item 512b, and the child data items 512c-f thereunder, will now be specifically referenced, although it will be appreciated, that these same features may be applied to any data item in any of the data tree hierarchies described herein. The summary data item 512b includes a cost summary field 560 and a purchase date summary field 561. The child data items 512c-f contain fields that correspond to each of these summary fields 560, 561. In particular, the costs fields 564 of the data items 512c-f correspond to the cost summary field 560, the purchase date fields 565 of the data items 512c-f correspond to the purchase date summary field 561. The cost summary field 560 summarizes data in the cost fields 564, the purchase date summary field 561 summarizes data in the purchase date fields 565. The cost fields 564 include the cost of particular items or services, and the purchase date fields 565 include the purchase date of particular items or services.

In one embodiment, the summary fields 560, 561 include summary values that summarize the data in their respective corresponding fields 564, 565. The summary values, including the values in any of the fields in the data tree hierarchy 508, may include numbers or text.

In one embodiment, a summary module (described above) applies a summarizing operation on the cost fields 564 to compute the summary value in the cost summary field 560. In particular, the summary module summates the values in the cost field 564 to compute a total cost value in the cost summary field 560. The summary operation that computes the summary value in the purchase date summary field 561 may calculate the range of dates in the purchase date fields 565 and display them in the purchase date summary field 561.

The different types of summarizing operations that may be used in the summary fields are numerous, and may be preset for selection by a user, customizably programmed by a user, or a combination thereof. Non-limiting examples of summarizing operations include summation, averaging, mean value, most common value, highest value, lowest value, most expensive value, etc.

It is noted that multiple users or a single user may add columns or categories, add or reposition data items anywhere within the data tree hierarchy 508, or change the values of any of the fields in the data tree hierarchy 508. Indeed, a user may add an entirely new data tree hierarchy table that is related to an existing data tree hierarchy table. In the case in which a new numerical field is added, the associated summary field may be automatically updated to reflect the newly added numerical field or value. Such an update in the summary data item 512b may be triggered by a change in the parent field of any added or modified child data item, as was described in FIG. 4.

To provide a specific example, the data tree hierarchy manager may receive input to change one of the values in the cost fields 564 for the data items 512c-f. In response, the summary module may update the value in the cost summary field 560 so that the new value reflects the sum of the updated cost values in the cost fields 564. As used, herein, changing the value to cause an updated summary value also includes adding a value to a field that did not previously contain a value.

The types of fields and values that may be included in the data tree hierarchy 508 are numerous and include, e.g., a bid or ask field associated with summary fields having a "highest first" or "lowest first" summary field value, respectively. These types of numerical smart fields may be included in a data tree hierarchy 508 that relates to the stock market, and may also include price fields that are summarized by a total summary field.

The summary data fields in the data tree hierarchy 508 may also be dynamically updated as a user or the administrator moves the child data items, such as the data item 512c-f, anywhere within the data tree hierarchy 508, thus keeping the summary field values current based on positions of the data items. Any number of users may have authority to modify the contents of the data tree hierarchy 508, depending on the permission settings or embodiment. The various fields of the data tree hierarchy 508 may also be modified using a separate interface, if desired. For example, a special entry window or interface may be used for the user to enter data into any of the fields in the data tree hierarchy 508.

Using the illustrative embodiments, a user may, in some cases, avoid having to manually enter formula information, which may be error-prone, and the illustrative embodiments may not be limited merely to document-based solutions that may have problems scaling to large amounts of data. Also, the illustrative embodiments are not limited to only allowing the administrator to modify column, row, or other table field data or formats. Illustrative embodiments may also improve upon certain systems that are read-only and do not allow repositioning, adding, or other modification of data in the data tree hierarchy 508 or other table. The illustrative embodiments may also not be limited only to simple primitives like integer and float values, and may also not be limited to being managed at the table level using stored procedures or constraints on certain fields. The illustrative embodiments are also not limited to having a separate layer of code on top of the database, as other codes and structures are possible in the illustrative embodiments. The data tree hierarchy 508, as described above, also includes summary information therein, which some current systems may lack. In one embodiment, the field may contain all information needed to maintain data integrity. This may allow a normal user to add the field to the tree. Current systems may define the structure and data integrity code separately, so only am administrator can change the structure, otherwise the data integrity can't be guaranteed.

It will be appreciated that the summary field, as well as the corresponding fields located in the data tree hierarchy 508, may occupy a same column in the data tree hierarchy 508. However, other spatial configurations are possible, such as reversing the row and column format, and other non-grid structures.

Figure 8:
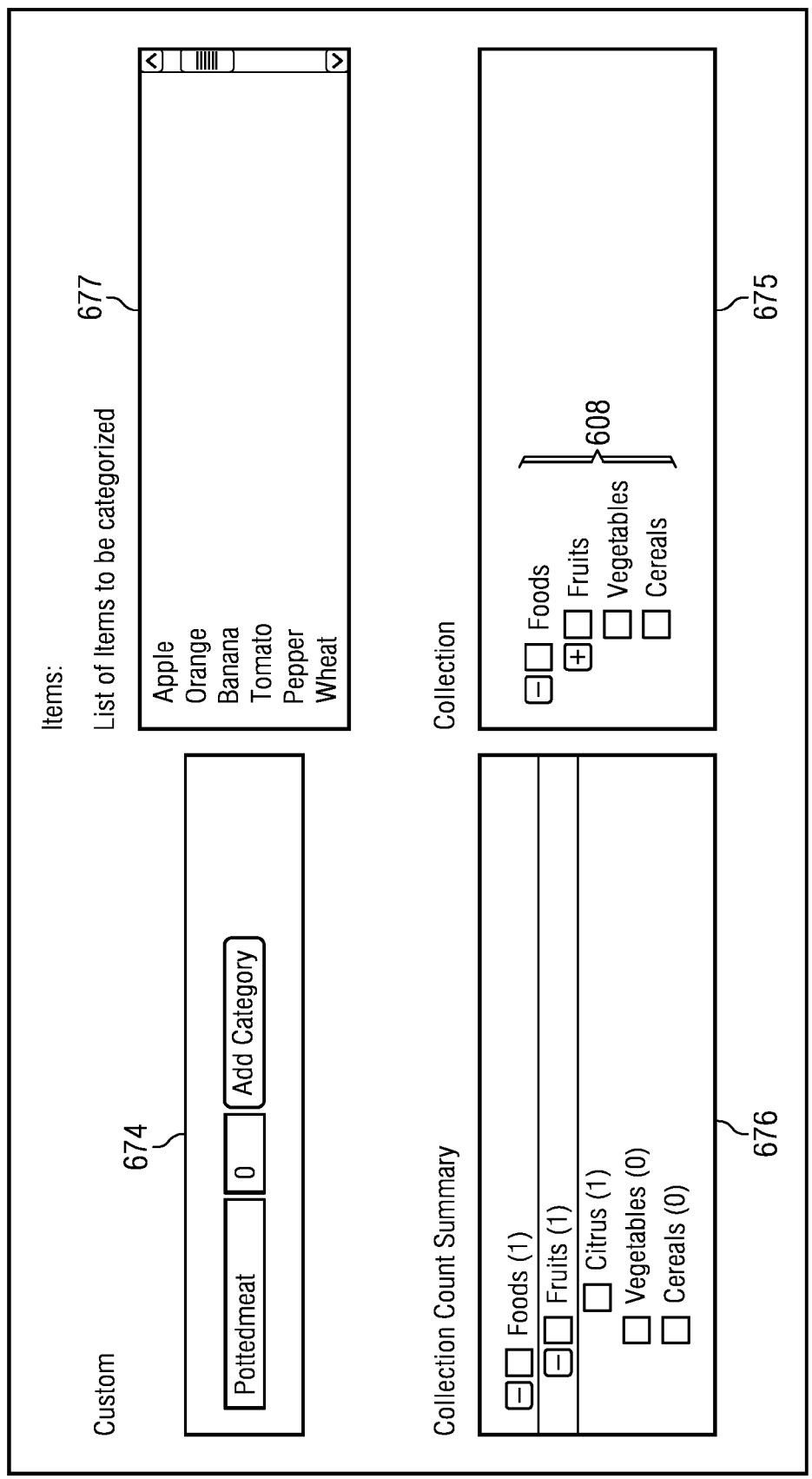
FIG. 8 is a schematic, pictorial representation of a graphical user interface that includes windows displaying different types of related data tree hierarchies according to an illustrative embodiment.

Referring to FIG. 8, an illustrative embodiment of a multi-window display in which the illustrative embodiments may be implemented is shown. Elements of FIG. 8 that are analogous to elements in FIG. 1 have been shown by indexing the reference numerals by 500. FIG. 8 contains multiple windows that may interact with one another. For example, an add category window 674 may allow a user to add a data item or category to the data tree hierarchy 608. The data tree hierarchy 608 may be displayed in a data tree window 675. A data tree hierarchy summary window 676 may include a summary data tree hierarchy that includes one or more summary data items, described in more detail above, summarizing the data items in the data tree hierarchy 608. Thus, in this embodiment, in lieu of or in addition to having summary data items contained in the data tree hierarchy 608 itself, a separate summary data tree hierarchy may be included in a graphical user interface that includes only summary data items. The summary data tree hierarchy may allow a user to reference summary data only instead of having to view an entire data tree hierarchy 608 to find summary data. The summary data tree hierarchy may be updated in response to changes to the data tree hierarchy 608. An item list 677 may also be included that lists items or content that may be moved to the data tree hierarchy 608. This list of items may include items added in the add category window 674.

One illustrative embodiment includes multiple tree indices. In some cases there may be more tree relations, such as group by month, group by category, group by user, etc. There may also be one data tree marked as dominant, and which is used to update a parent item. Other trees may be shadows, and not be used to update the parent item. The parent item summary may not be counted both times.

By way of non-limiting example, a table may have a group by month, and a group by category. If there are too many items for a month to link to a parent item, these items may break up into overflow items which are grouped by category for that month. Then when building groups by category tree, if there are too many items for that category, it may utilize previously-created, submonth/category subgroups. Thus, two trees may share the same subgroup. This embodiment is not limited to having separate X and Y indices in which the X, Y, and R tree are separate or independent of one another.

Figure 9:
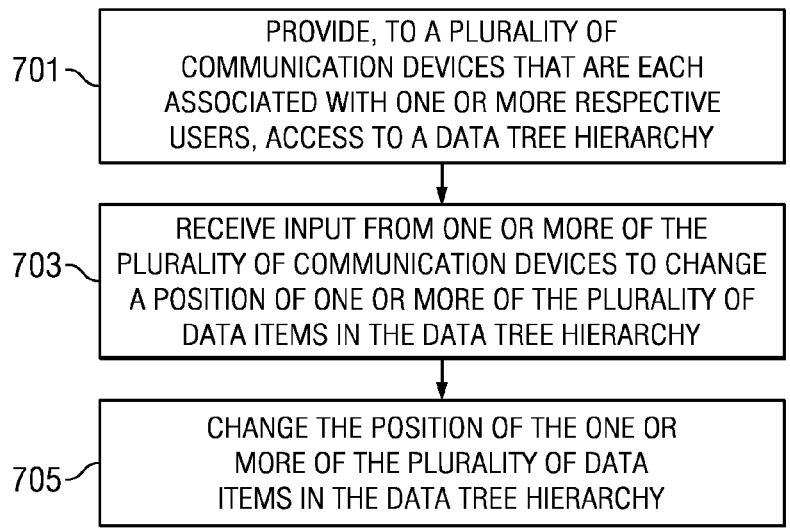
FIG. 9 is a flowchart of a process for customizing a data tree hierarchy according to an illustrative embodiment.

Referring to FIG. 9, an illustrative embodiment of a process for customizing the data tree hierarchy, which may be implemented by a data tree hierarchy manager, includes providing, to a plurality of communication devices that are each associated with one or more respective users, access to a data tree hierarchy (step 701). In one embodiment, the data tree hierarchy is adapted, to include a plurality of data items, and each of the plurality of data items may be positionable at one of the plurality of hierarchal levels.

The process may receive input from, one or more of the plurality of communication devices to change a position of one or more of the plurality of data items in the data tree hierarchy (step 703). The process may change the position of the one or more of the plurality of data items in the data tree hierarchy (step 705). In one embodiment, step 705 may be performed after determining whether the communication device, or associated, user, has permission, to change the position of the data item.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 10:
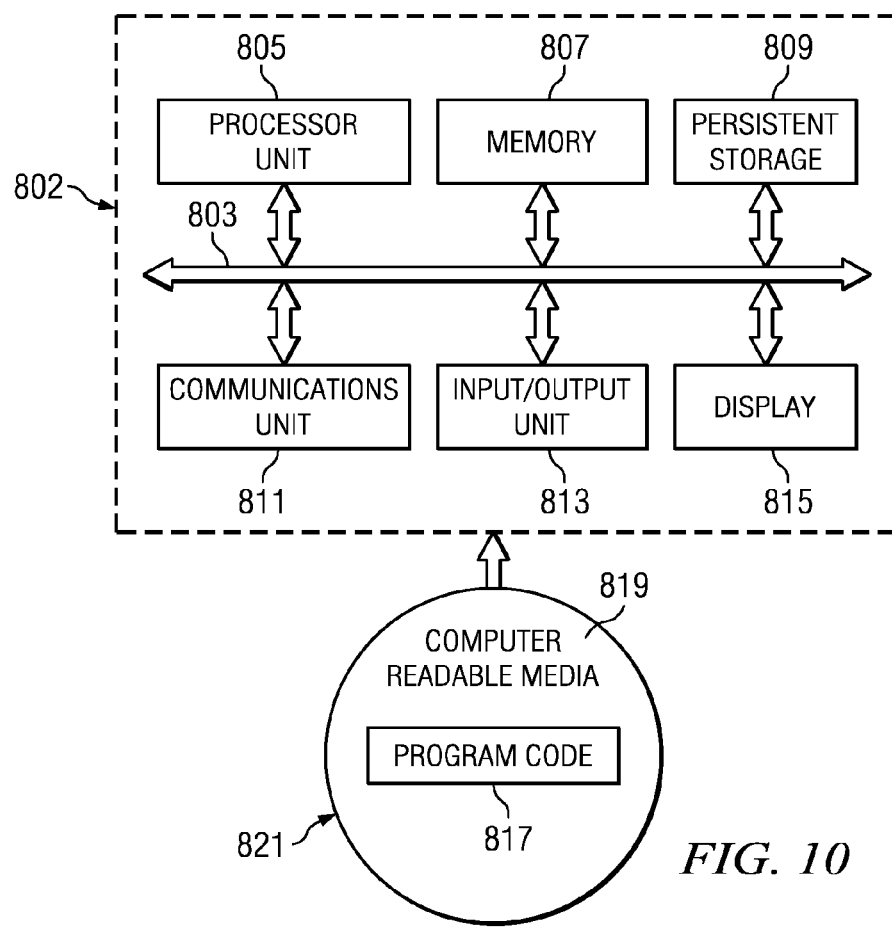
FIG. 10 is a schematic, block diagram of a data processing system in which the illustrative embodiments may be implemented.

Referring to FIG. 10, a block diagram of a computing device 802 is shown in which the illustrative embodiments may be implemented. In one embodiment, the data tree hierarchy manager 106 or 206 described in FIG. 1 or 2, respectively, may be implemented on the computing device 802. Computer-usable program code or instructions implementing the processes used in the illustrative embodiments may be located on the computing device 802. The computing device 802 includes a communications fabric 803, which provides communications between a processor unit 805, a memory 807, a persistent storage 809, a communications unit 811, an input/output (I/O) unit 813, and a display 815.

The processor unit 805 serves to execute instructions for software that may be loaded into the memory 807. The processor unit 805 may be a set of one or more processors or may be a multi-processor core, depending on the particular implementation. Further, the processor unit 805 may be implemented using one or more heterogeneous processor systems in which a main processor is present with secondary processors on a single chip. As another illustrative example, the processor unit 805 may be a symmetric multi-processor system containing multiple processors of the same type.

The memory 807, in these examples, may be, for example, a random access memory or any other suitable volatile or non-volatile storage device. The persistent storage 809 may take various forms depending on the particular implementation. For example, the persistent storage 809 may contain one or more components or devices. For example, the persistent storage 809 may be a hard, drive, a flash memory, a rewritable optical disk, a rewritable magnetic tape, or some combination of the above. The media used, by the persistent storage 809 also may be removable. For example, a removable hard drive may be used for the persistent storage 809.

The communications unit 811, in these examples, provides for communications with other data processing systems or communication devices. In these examples, the communications unit 811 may be a network interface card. The communications unit 811 may provide communications through the use of either or both physical and wireless communication links.

The input/output unit. 813 allows for the input and output of data with other devices that may be connected to the computing device 802. For example, the input/output unit 813 may provide a connection for user input through a keyboard and mouse. Further, the input/output unit 813 may send, output to a processing device. In the case in which the computing device 802 is a cellular phone, the input/output unit 813 may also allow devices to be connected to the cellular phone, such as microphones, headsets, and controllers. The display 815 provides a mechanism to display information to a user, such as a graphical user interface.

Instructions for the operating system and applications or programs are located on the persistent storage 809. These instructions may be loaded into the memory 807 for execution by the processor unit 805. The processes of the different embodiments may be performed by the processor unit 805 using computer-implemented instructions, which may be located in a memory, such as the memory 807. These instructions are referred to as program code, computer-usable program code, or computer-readable program code that may be read and executed by a processor in the processor unit 805. The program, code in the different embodiments may be embodied on different physical or tangible computer-readable media, such as the memory 807 or the persistent storage 809.

Program code 817 is located in a functional form on a computer-readable media 819 and may be loaded onto or transferred to the computing device 802 for execution by the processor unit 805. The program code 817 and the computer-readable media 819 form computer program product 821 in these examples. In one embodiment, the computer program product 821 is the data tree hierarchy manager 106 or 206 described in FIG. 1 or 2, respectively. In this embodiment, the program code 817 may include computer-usable program code capable of providing, to a plurality of communication devices that are each associated with one or more respective users, access to a data tree hierarchy. The data tree hierarchy may be adapted to include a plurality of data items, and each of the plurality of data items may be positionable at one of a plurality of hierarchal levels. The program code 817 may also include computer-usable program code capable of receiving input from one or more of the plurality of communication devices to change a position of one or more of the plurality of data items in the data tree hierarchy, and changing the position of the one or more of the plurality of data items in the data tree hierarchy in response to receiving the input from the one or more of the plurality of communication devices.

Any combination of the above-mentioned computer-usable program code may be implemented in the program code 817, and any functions of the illustrative embodiments may be implemented in the program code 817.

In one example, the computer-readable media 819 may be in a tangible form, such as, for example, an optical or magnetic disc that is inserted or placed into a drive or other device that is part of the persistent storage 309 for transfer onto a storage device, such as a hard drive that is part of the persistent storage 809. In a tangible form, the computer-readable media 819 also may take the form of a persistent storage, such as a hard drive or a flash memory that is connected to the computing device 802. The tangible form of the computer-readable media 819 is also referred to as computer recordable storage media.

Alternatively, the program code 817 may be transferred to the computing device 802 from the computer-readable media 819 through a communication link to the communications unit 811 or through a connection to the input/output unit 813. The communication link or the connection may be physical or wireless in the illustrative examples. The computer-readable media 819 also may take the form of non-tangible media, such as communication links or wireless transmissions containing the program code 817. In one embodiment, the program code 817 is delivered to the computing device 802 over the Internet.

The different components illustrated for the computing device 802 are not meant to provide architectural limitations to the manner in which different embodiments may be implemented. The different illustrative embodiments may be implemented in a data processing system including components in addition to or in place of those illustrated for computing device 802. Other components shown in FIG. 10 can be varied from the illustrative examples shown.

As one example, a storage device in the computing device 802 is any hardware apparatus that may store data. The memory 807, the persistent storage 809, and the computer-readable media 819 are examples of storage devices in a tangible form.

In another example, a bus system may be used to implement the communications fabric 803 and may be comprised of one or more buses, such as a system bus or an input/output bus. Of course, the bus system may be implemented using any suitable type of architecture that provides for a transfer of data between different components or devices attached to the bus system. Additionally, the communications unit 811 may include one or more devices used to transmit and receive data, such as a modem or a network adapter. Further, a memory may be, for example, the memory 807 or a cache such as found in am interface and memory controller hub that may be present in the communications fabric 803.

As used herein, including in the claims, the terms first, second, third, etc. . . . used in relation to an element (e.g., first user, second user, etc.) are for reference or identification purposes only, and these terms, unless otherwise indicated, are not intended to describe or suggest a number, order, source, purpose, or substantive quality for any element for which such a term is used.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. A method for customizing a data tree hierarchy, the method comprising:

providing, to a plurality of communication devices that are each associated with one or more respective users, access to a data tree hierarchy defined by data stored on one or more storage devices, the data tree hierarchy including a plurality of data items, each of the plurality of data items positionable at one of a plurality of hierarchal levels, wherein:

the plurality of hierarchal levels includes at least a first, parent level; and the first level includes at least one of the plurality of data items, the data item included in the first level being a summary data item having one or more summary fields;

receiving, from one or more of the plurality of communication devices, user input defining a parent-child relationship between (i) one or more selected data items and (ii) an existing first summary data item at the first, parent level, wherein the parent-child relationship assigns the one or more selected data items to a second, child level associated with the existing first summary data item not previously having associated data items at the second, child level at the time the user input defining the parent-child relationship between the one or more selected data items and the existing first summary data item is received, and wherein each of the one or more selected data items includes one or more data fields that:

correspond to the one or more summary fields in the associated first summary data item; and include a numerical value;

calculating, with a computing device, a numerical summary value for one or more of the summary fields of the first summary data item, wherein the summary value is calculated automatically in response to receiving the user input defining the parent-child relationship between the one or more selected data items and the existing first summary data item, the summary value is calculated based on a predefined algorithm, and the summary value is calculated based on the numerical value in the one or more data fields of the one or more selected data items; and storing the calculated summary value.

2. The method of claim 1, further comprising:

receiving input to change one of the values in the one or more data fields in the selected data items at the second, child level; and updating one or more summary values in response to receiving the input to change one of the values in the one or more data fields in the selected data items at the second, child level.

3. The method of claim 1, wherein the one or more data fields in the selected data items at the second, child level and the one or more summary fields occupy a same column in the data tree hierarchy.

4. The method of claim 1, further comprising:

setting a permission level for at least one of the respective users, the permission level determining whether the at least one of the respective users is permitted to change at least one of a position or a content of at least a portion of the plurality of data items.

5. The method of claim 4, wherein the permission level for the at least one of the respective users is set such that the at least one of the respective users is permitted to change a position of one or more data items added to the data tree hierarchy by the at least one of the respective users, and such that the at least one of the respective users is prohibited from changing a position of one or more data items added by users other than the at least one of the respective users.

6. The method of claim 1, wherein the method is implemented by a data tree hierarchy manager on a server adapted to communicate with the plurality of communication devices; and
wherein the input is received from an administrator of the data tree hierarchy manager associated with the server.

7. The method of claim 1, wherein each of the plurality of data items occupies a row in the data tree hierarchy.

8. The method of claim 1, further comprising:
displaying a data tree window including the data tree hierarchy on a graphical user interface;
displaying a data tree hierarchy summary window on the graphical user interface, the data tree hierarchy summary window including a summary data tree hierarchy comprising one or more summary data items summarizing the plurality of data items in the data tree hierarchy; and
updating the summary data tree hierarchy in response to a change to the data tree hierarchy.

9. The method of claim 1, wherein the plurality of hierarchal levels are hierarchically nested.

10. The method of claim 1, wherein each of the plurality of data items comprises at least one of a parent field or a child field, the parent field indicating one or more parent data items associated with the data item, the child field indicating one or more child data items associated with the data item.

11. The method of claim 1, wherein at least a portion of the data items in the data tree hierarchy have multiple tree index fields, with each tree index field identifying a different data tree each having a different hierarchical arrangement of data items having at least some different associations between parent data items and child data items.

12. The method of claim 11, wherein the multiple tree index identifies a first tree and a second tree, and wherein the first tree and the second tree share a common tree portion.

13. The method of claim 1 wherein the one or more selected data items include a sub-set of the plurality of data items in the data tree hierarchy, the method further comprising receiving input from one or more of the plurality of communication devices to change a position of the one or more selected data items in the data tree hierarchy to the second, child level associated with the first summary data item, wherein adding the one or more selected data items at the second, child level associated with the first summary data item includes changing the position of the one or more selected data items in the data tree hierarchy in response to receiving the input from the one or more of the plurality of communication devices.

14. The method of claim 13 wherein the at least one of the one or more selected data items comprises a second summary data item having one or more summary fields and having one or more associated data items at a third, grandchild level and the associated data items in the third level include one or more corresponding fields that correspond to one or more summary fields in the associated second summary data item, with the one or more summary fields in the second summary data item summarizing data in the one or more corresponding fields of the associated data items at the third level.

15. The method of claim 14 wherein changing the position of the one or more selected data items in response to receiving the input from the one or more of the plurality of communication devices includes changing the position of the one or more associated data items at the third, grandchild level.

16. The method of claim 1 further comprising:
receiving input from one or more of the plurality of communication devices to create the one or more selected data items in the data tree hierarchy at the second, child level associated with the first summary data item; and
adding the one or more selected data items at the second, child level associated with the first summary data item in response to receiving user input defining the parent-child relationship.

17. The method of claim 1 further comprising:
receiving input from at least one of the plurality of communication devices to add a plurality of data items to a specified level;
determining whether the plurality of data items to be added causes a number of data items at the specified level to meet or exceed a predetermined overflow threshold; and
creating an overflow group in the data tree hierarchy and moving at least a portion of the plurality of data items added to the specified level to the overflow group in response to determining that the plurality of data items to be added causes a number of data items at the specified level to meet or exceed a predetermined overflow threshold.

18. The method of claim 17 wherein the overflow group includes a second summary data item at the specified level having one or more summary data fields and having the moved data items at a child level with respect to the specified level, with the moved data items in the child level with respect to the specified level including one or more data fields that correspond to the one or more summary fields in the second summary data item, with the one or more summary fields in the second summary data item summarizing data in the one or more data fields of the data items at the child level with respect to the specified level.

19. The method of claim 1 wherein the calculated summary value is stored on a central server adapted to communicate with the plurality of communication devices for display of at least a portion of the data tree hierarchy including the calculated summary value.

20. The method of claim 1 wherein receiving user input defining the parent-child relationship includes receiving input from one or more of the plurality of communication devices to move the one or more selected data items from a previously defined location in the data tree hierarchy to the second, child level associated with the existing first summary data item.

21. The method of claim 1 wherein:
the first summary data item includes a plurality of summary fields;
each of the one or more selected data items includes a plurality of data fields, with each of the plurality of data fields corresponding to one of the summary fields of the first summary data item; and
calculating a numerical summary value for one or more of the summary fields of the first summary data item includes calculating a numerical summary value for each of the summary fields based on the numerical values of the corresponding data fields for the one or more selected data items.

22. The method of claim 21 further comprising automatically identifying the data fields of the one or more selected data items used for calculating the summary value of the corresponding summary field in response to receiving the user input defining the parent-child relationship between the one or more selected data items and the first summary data item.

23. The method of claim 1, wherein the summary value is calculated based on an algorithm determined without user input defining the algorithm at the time the user input defining the parent-child relationship is received.

24. A data, tree hierarchy manager comprising:
one or more processors adapted to:
provide, to a plurality of communication devices, access to a data tree hierarchy, the data tree hierarchy adapted to include a plurality of data items, each of the plurality of data items positionable at one of a plurality of hierarchal levels:
wherein the plurality of hierarchal levels comprises at least a first, parent level; and
wherein the first level includes one of the plurality of data items, the data item positioned in the first level being a summary data item;
receive input from one or more of the plurality of communication devices to define a parent-child relationship between (i) one or more selected data items and (ii) an existing first summary data item at the first, parent level, wherein the parent-child relationship assigns the one or more selected data items to a second, child level associated with the existing first summary data item not previously having associated data items at the second, child level at the time the input defining the parent-child relationship between the one or more selected data items and the existing first summary data item is received, and wherein each of the one or more selected data items includes one or more data fields that:
correspond to the one or more summary fields in the associated first summary data item; and
include a numerical value; and
perform a summarizing operation on the numerical values in the one or more data fields in the one or more selected data items to calculate a numerical summary value for one or more of the corresponding summary fields of the first summary data item, wherein the summary value is calculated automatically in response to receiving user input defining the parent-child relationship between the one or more selected data items and the existing first summary data item, the summary value is calculated based on a predefined algorithm, and the summary value is calculated based on the numerical value in the one or more data fields of the one or more selected data items.

25. The data tree hierarchy manager claim 24, wherein the one or more processors are operable to cause the plurality of communication devices to display the summary value in a summary field.

26. The data tree hierarchy manager claim 24, further comprising:
a permissions manager to set a permission level for at least one of (1) an administrator of the data tree hierarchy manager or (2) a user associated with at least one of the plurality of communication devices, the permission level determining an authority to change at least one of a position or a content of one or more of the plurality of data items.

27. The data tree hierarchy manager claim 24, wherein the one or more processors are further adapted to:
receive search criteria from at least one of the plurality of communication devices and identify data in the plurality of data items matching the search criteria; and
graphically indicate the identified data on a graphical user interface.

* * * * *